Feb. 18, 1958　　　N. S. REYNOLDS　　　2,823,966
FLOATING SEAL
Original Filed July 2, 1953
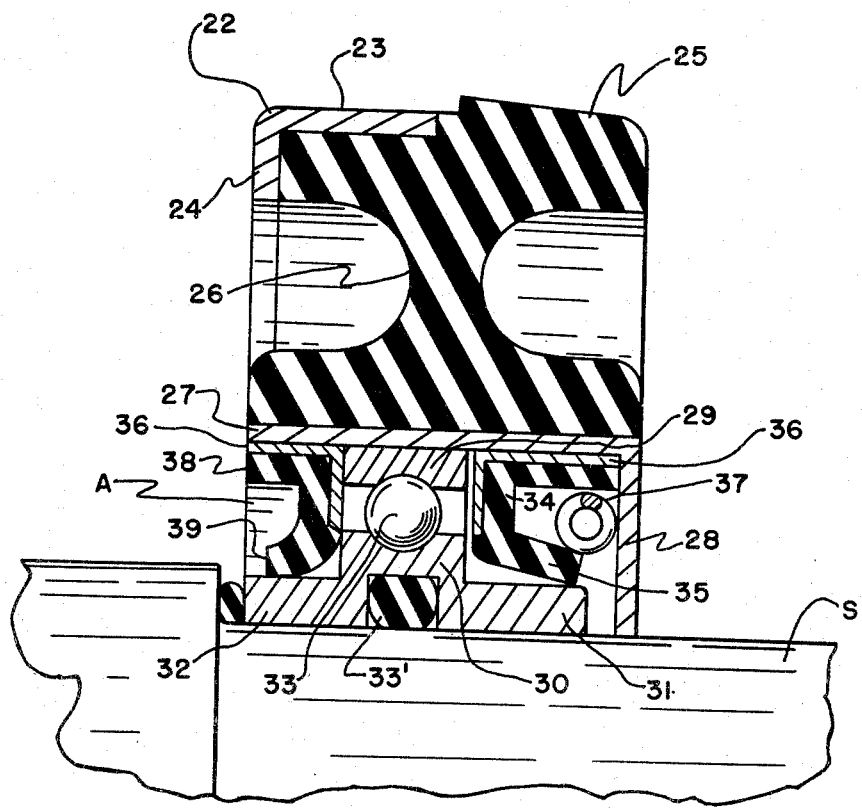

United States Patent Office 2,823,966
Patented Feb. 18, 1958

2,823,966
FLOATING SEAL

Noel S. Reynolds, St. Louis, Mo., assignor, by mesne assignments, to Federal-Mogul-Bower Bearings, Inc., Detroit, Mich., a corporation of Michigan Original application July 2, 1953, Serial No. 365,702, now Patent No. 2,797,938, dated July 2, 1957. Divided and this application June 29, 1956, Serial No. 598,491

3 Claims. (Cl. 308—187.1)

This invention relates to seals for relatively rotating members such as a shaft and a casing structure, and more particularly to the mounting of such a type of seal, and additionally to its construction so it is capable of a floating action, that is, being capable, in the event of eccentric action between the shaft and casing structure, to follow the shaft movement and at all times maintain sealing action with the shaft surface. This application is a division of my earlier filed application, Serial No. 365,702, filed July 2, 1953, now Patent Number 2,797,938.

One of the objects of my invention is to produce an improved seal which can be manufactured at a low cost, be easily installed and one which will function efficiently at all times.

Another object is to produce an improved seal that can be easily installed with a "pressed in fit" with the casing bore surrounding the shaft.

Yet another object is to produce a "pressed fit" type of seal for mounting in a bore which is so constructed that the desired fitting in the bore can be obtained in a simple and cheap manner.

Still another object is to produce a floating seal in which the inner structure thereof, which seals with a rotating shaft, is capable of continuous sealing engagement with the shaft in the event the shaft moves eccentrically to the casing structure in which it is mounted, yet the seal is capable of maintaining firm sealing action with the casing and the seal is constructed so all eccentric movement is easily compensated for in a simple manner.

A further object is to produce an improved floating seal in which the sealing lip having sealing action at the shaft or like rotatable element is prevented from receiving eccentric wear by the action of a bearing ring associated with the lip.

Another and very important object is to produce a floating seal in which the rubber (or like material) sealing lip will have associated therewith a bearing member to prevent undesirable eccentric wear on the lip and said material of seal having the lip and the material of the bearing member will have such coefficients of expansion and will be so connected to each other that one's expansion and contraction will compensate for the other's under various temperature conditions existing during both rotation and non-rotation of a shaft being sealed.

Another object is to produce an improved floating seal of the kind referred to that can have embodied therewith an anti-friction bearing to be carried by the shaft in sealing engagement therewith to thus provide a seal with minimum friction action and resulting heat and also one having minimum wear.

Other objects of the invention will become apparent from the following description taken in connection with the accompanying drawings in which the drawing is a cross sectional view of a seal construction embodying the invention in which the seal is associated with an anti-friction bearing so that the friction at the shaft may be reduced when there are large diameter rotatable members being sealed.

In the drawing a seal is disclosed in which the floating and "press in" features are embodied. This seal is associated with an anti-friction bearing to reduce friction between the seal and the shaft. It is particularly adaptable where the rotatable shaft or equivalent member has a relatively large diameter.

In the seal shown there is a supporting ring 22 which can be made of pressed sheet metal having an annular band portion 23 to fit into a casing bore and a flange portion 24 for strength. To this support ring is bonded a rubber member 25 having an outer peripheral portion taper with its greatest diameter greater than that of the support ring so there can be a "press in" mounting of the seal in a casing bore.

The member 25 has a reduced thickness 26 to produce a flexible web and is bonded to a band 27 in which is carried the anti-friction bearing generally indicated by the letter A. The band 27 has an inturned flange 28 which will be on the outside of the seal and bearing.

The anti-friction bearing, as shown, is of the rolling ball type having an outer race 29 mounted in the band and an inner race 30 having double flanges 31 and 32 for mounting on the shaft with the balls 33 riding in between. To seal the inner race to the shaft, there is an O-ring 33' carried in a groove in the race.

To seal the ball type of bearing on both sides thereof, a rubber seal 34 is mounted on the outer side of somewhat C-shape in cross section having a lip 35 for engaging the flange 31 of the inner race and an outer part carrying a metal ring support 36 for press fit engagement with the band 27. To assure a good pressure engagement of the lip on the flange 31, a garter spring 37 can be employed, being held in position by the flange 28 on the band.

On the inside of the ball bearing is a similar rubber seal 38 of somewhat C-shaped cross section having a lip 39 for cooperating with the flange 32 of the inner race. The rubber seal 38 carries a support ring which is press fitted into the band 27.

With this seal structure shown it is seen that the seal can have a "press in" fit by hand into a casing bore or equivalent construction. This is permissible because of the support ring 22 and the tapered peripheral surface of rubber member 25. The seal is full floating, due to the reduced thickness between the bore engaging part of the member 25 and the sealing structure with the shaft which has embodied therein an anti-friction bearing. This anti-friction bearing is fully sealed with the shaft and further so sealed that any fluid under pressure cannot pass through the bearing balls. On the outer side of the seal where the pressures are likely to be highest, the sealing action is acted on by spring action.

The seal disclosed in the drawing and described above as embodying my invention is presented by way of example only, and I desire it to be understood that still other seal structures can be made without departing from the fundamental principles of the invention. I therefore do not intend that the scope of the invention is to be limited except in accordance with the appended claims.

What is claimed is:

1. In a seal for association with two relatively rotatable members having concentric cylindrical surfaces, said seal having a member of rubber or like material provided with an outer annular portion, an inner annular portion and a flexible connecting web portion, an annular support ring of rigid material secured to the outer portion of the rubber member and of an outer diameter to fit into the outer of the concentric cylindrical surfaces, said outer portion of the rubber member having a part of its material axially adjacent the supporting ring and provided with a peripheral surface inclined to the axis of the seal with its greatest diameter adjacent the support ring and of a diameter size slightly greater than the outer diameter of the support ring, an anti-friction bearing means of the ball type with inner and outer races carried by the inner portion of the rubber member and arranged to be positioned between it and the inner of the concentric cylindrical surfaces, and means for sealing the anti-friction bearing means.

2. An oil seal for use between two relatively rotating cylindrical members generally concentric to each other but subject to some eccentric motion, comprising: a radially extending metal ring with an outer periphery that fits non-rotatively against one said relatively rotating member, an inner periphery and a radial face therebetween; an elastomeric ring with an outer periphery in engagement with said one relatively rotating member, said elastomeric ring extending radially and having a radial face bonded to said metal ring radial face and having a portion extending radially inwardly beyond said metal ring inner periphery with a thinned part and an inner periphery; an anti-friction bearing means of a ball type with inner and outer races carried by said inner periphery of said elastomeric ring and arranged to be positioned between it and the inner of said concentric cylindrical surfaces; and means for sealing said anti-friction bearing means.

3. An oil seal for use between two relatively rotating cylindrical members generally concentric to each other but subject to some eccentric motion, comprising: a radially extending metal ring with an outer periphery that fits non-rotatively against one said relatively rotating member, an inner periphery and a radial face therebetween; an elastomeric ring with an outer periphery in engagement with said one relatively rotating member, said elastomeric ring extending radially and having two radial faces, one being bonded to said metal ring radial face along the full extent thereof and having a portion extending radially inwardly beyond said metal ring inner periphery said portion being thinned by a pair of opposite annular grooves in each of its radial faces and having an inner periphery; a rigid cylindrical member bonded to said inner periphery of said elastomeric ring and having a larger diameter than the inner of said concentric cylindrical surfaces; an anti-friction bearing positioned in said cylindrical member and arranged to have one of its races cooperate therewith and the other of its races to cooperate with the inner of said concentric cylindrical surfaces; and a sealing means between said races and between each race and the member with which it is carried.

References Cited in the file of this patent

UNITED STATES PATENTS 2,092,291  Olsen _____ Sept. 7, 1937

FOREIGN PATENTS 556,441  Great Britain _____ Oct. 5, 1943